United States Patent [19]

Tomich

[11] Patent Number: 4,534,698
[45] Date of Patent: Aug. 13, 1985

[54] BLADE CONTAINMENT STRUCTURE
[75] Inventor: Michael J. Tomich, Lynnfield, Mass.
[73] Assignee: General Electric Company, Lynn, Mass.
[21] Appl. No.: 488,563
[22] Filed: Apr. 25, 1983
[51] Int. Cl.³ .............................................. F01D 21/00
[52] U.S. Cl. .................................. 415/9; 415/121 G; 415/200
[58] Field of Search .................... 415/9, 174, 196, 197, 415/121 G, 200

[56] References Cited
U.S. PATENT DOCUMENTS 4,295,787 10/1981 Lardellier .............................. 415/197
4,377,370 3/1983 Porcelli .................................. 415/9
4,411,589 10/1983 Joubert et al. ................... 415/197 X
4,425,080 1/1984 Stanton et al. ...................... 415/9 X
4,452,565 6/1984 Monhardt et al. .......... 415/121 G X

FOREIGN PATENT DOCUMENTS 2037900 7/1980 United Kingdom ................ 415/197

OTHER PUBLICATIONS

D.C.I.D. 648066, Engine Assembly Drawing Update, Issue Date Apr. 27, 1981, portions of pp. 1 and 6 combined including sketch 1.
Drawing 6040T69, Engine Assembly Turbofan, CF34–GE–1A, portions illustrating inclusion of containment casing as per D.C.I.D. 648066.
NASA Report CR–165212, May 1981, Development of Advanced Lightweight Containment Systems, two title pages and pp. 3,4,6,39,40, and 72–75.
GE Report R82AEB045, Apr. 1982, Large Bird Ingestion Test, two title pages and p. 47.
GE Report R82AEB053, May 1982, Fan Blade Ingestion and Containment, two title pages and pp. 1, 44, and 45.
FAA Type Certificate for CF34–1A, Aug. 18, 1982.

Primary Examiner—Robert E. Garrett
Assistant Examiner—Joseph M. Pitko
Attorney, Agent, or Firm—Derek P. Lawrence; Francis L. Conte

[57] ABSTRACT

A blade containment structure employs a two-layer honeycomb region radially outward of a fan blade rub strip. The two layers are separated by a septum and each layer contributes independently to strength and stiffness of the structure. A Kevlar blanket radially outward of the honeycomb region retains blade fragments which may be broken loose by ingestion of large objects such as, for example, birds. The radially inner honeycomb region is deep enough to position the septum out of the orbit of blade tips in an engine made unbalanced by loss of one or more fan blades. The septum and outer honeycomb region retains sufficient strength in the structure for supporting forward components.

17 Claims, 2 Drawing Figures

BLADE CONTAINMENT STRUCTURE

BACKGROUND OF THE INVENTION

The present invention relates to engines and, more particularly, to a fan blade containment structure including means for retaining structural strength in the sealing area of a fan of a fan jet engine after damage due to fan imbalance caused by accidental loss of fan blade fragments.

A fan jet engine includes a high-volume fan at its forward end for forcing ambient air into a flow passage which then splits into a first flow passage entering an axial compressor, combustor and turbine and a second flow passage bypassing the first flow passage for providing direct thrust. Since the fan is at the forward end of the engine, it is the rotating element most at risk of damage in impact with foreign objects such as, for example, birds. A bird strike may damage the fan and, in an extreme case, may dislodge one or more fragments or entire blades of the fan which tend to fly off energetically.

In order to contain such fragments, blade fragment containment structures found in the prior art typically include an annular band of a high strength material such as, for example, steel, surrounding the tips of the fan blades for intercepting such fragments before they can pass out of the engine and cause further damage to the aircraft or surrounding area. Steel is, of course, a heavy material and its use is contrary to the conventional desire for light weight in aircraft structures.

In many types of engines, additional elements such as, for example, inlet cowls, are conventionally supported forward of the fan by the blade containment structure. In the case of a fan structure including a steel armor band, the steel armor band provides substantial strength for supporting such forward structures.

In an attempt to reduce the weight of a blade containment structure, simulations and tests were performed employing a high-strength fabric to replace the steel armor. The high-strength fabric was a fabric commercially known as Kevlar produced by E. I. duPont Nemours & Co. The tests showed that a blanket of Kevlar was successful in retaining fan blade fragments. The test results were reported to NASA in May 1981 in report number NASA CR-165212. In the NASA tests, a layer of honeycomb was provided inside the Kevlar blanket for supporting a sealing strip adjacent the blade tips.

The applicant has discovered that worst-case failure of a fan of a fan jet engine such as, for example, the loss of one blade and one-third of an adjacent blade due to, for example, bird ingestion, seriously unbalances the engine to the extent that the remaining blades of the fan rotate at an increased radius due to an eccentric center of gravity. In this condition, the tips of the remaining fan blades penetrate outward beyond their normal working radius whereby they damage an annular band including the sealing strip and at least the radially inner wall of the honeycomb plus at least a substantial portion of the honeycomb core.

When one wall of a honeycomb structure is completely destroyed, a considerable amount of the strength and stiffness of the honeycomb structure is lost. The remaining strength and stiffness of the damaged structure is little more than the strength and stiffness of the remaining honeycomb wall. Since honeycomb walls are conventionally relatively thin aluminum or composite sheet, the remaining strength and stiffness of the damaged annular region corresponds approximately to the low strength and stiffness of the outer wall of the original honeycomb in this region.

As previously noted, forward structures may depend on the regions surrounding the fan blade tips for their support. Without the strength contributed by the steel band which is eliminated by using a high-strength fabric for the fragment-containment function, the damaged honeycomb structure may have insufficient strength to adequately support the forward structures attached to it and further engine damage may occur.

OBJECTS AND SUMMARY OF THE INVENTION

Accordingly, it is an object of the invention to provide a new and improved blade containment structure.

It is a further object of the invention to provide a blade containment structure in the sealing area of a fan which retains substantial strength after an annular region of a honeycomb flow path has been damaged by orbiting of the remaining blades following a blade failure.

It is a further object of the invention to provide a double honeycomb blade containment structure including a central septum which permits an inner wall of the honeycomb structure to be damaged while retaining substantial strength of and stiffness in the remaining honeycomb structure.

It is a further object of the invention to provide a blade containment structure surrounding a fan in a fan jet engine comprising a honeycomb structure surrounding tips of blades of the fan, a fabric blanket surrounding the honeycomb structure, the fabric blanket being of a type effective to contain fragments of the blades thrown outward by damage to the fan, the honeycomb structure including an inner honeycomb region having an inner wall and a septum, the septum being an outer wall of the inner honeycomb region and being spaced a predetermined distance radially outward from the inner wall, the honeycomb structure further including an outer honeycomb region having an outer wall, the septum being an inner wall of the outer honeycomb region, and the predetermined distance exceeding a maximum radial penetration distance by tips of blades in a maximum unbalanced condition of the fan whereby the outer honeycomb region remains intact and provides structural strength to the blade containment structure.

Briefly stated, one embodiment of the present invention provides a two-layer honeycomb region in an annulus surrounding the tips of a fan blade in a fan jet engine. The inner layer of honeycomb is deep enough to be sacrificed by the tips of an unbalanced fan without the outer layer of honeycomb being substantially damaged. The result is that the honeycomb region retains substantial strength due to the remaining outer honeycomb layer and avoids further damage due to inadequate support of forward structures.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
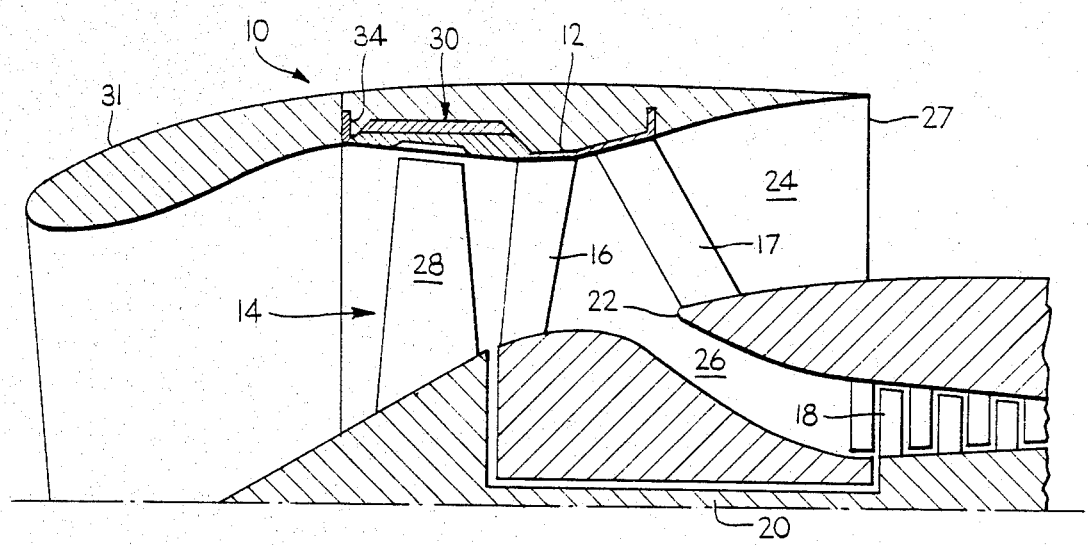
FIG. 1 is a side view, partially in cross-section of a forward portion of a fan jet engine including a fan sealing area with a blade containment structure according to one embodiment of the present invention.

Referring now to FIG. 1 there is shown, generally at 10, an exemplary fan jet engine employing one embodiment of the present invention. Only so much of fan jet engine 10 is shown as is required for an understanding of the present invention. As is conventional, fan jet engine 10 includes a fan casing 12 which surrounds a fan 14 and is typically supported by exit guide vanes 16 and tie rods 17. A compressor section, shown generally at 18, is located aft of the fan 14. Other conventional elements such as a combustion section, a turbine section and exhaust section (not shown) are included in a conventional engine. Since these are conventional elements well known to those skilled in the art, further illustration and description thereof is omitted.

In the embodiment of the exemplary engine 10 shown, shafts 20 driven by turbines (not shown) drive compressor section 18 as well as fan 14 at a high speed such as, for example, 7300 fan RPM. Fan 14 moves a large volume of air through exit guide vanes 16 where it is divided by a splitter 22 into a bypass flowpath 24 and an engine flowpath 26. The relatively large volume of air which flows in bypass flowpath 24 is delivered directly to an annular fan discharge nozzle 27 where it produces a substantial amount of the total thrust of fan jet engine 10. The remaining air flow through engine flowpath 26 is compressed, heated and employed to drive a turbine (not shown) which drives compressor section 18 and fan 14 as well as providing an exhaust which produces the remainder of the thrust from fan jet engine 10.

The fan 14 includes a plurality of circumferentially spaced fan blades 28 which may be made of a high-strength, low weight material such as a titanium alloy and may be, for example, twelve to fourteen inches long. Each such blade may weigh on the order of 2 to 3 pounds and, when rotating at its designed speed, may have a kinetic energy of about 30,000 foot pounds. An annular blade containment structure 30 according to one embodiment of the present invention is disposed immediately surrounding the path of blades 28 and is effective for receiving blade fragments which may be accidentally released and retaining them without permitting them to become free projectiles exterior to fan jet engine 10. Furthermore, the containment structure 30 is also effective for supporting an inlet cowl 31.

Figure 2:
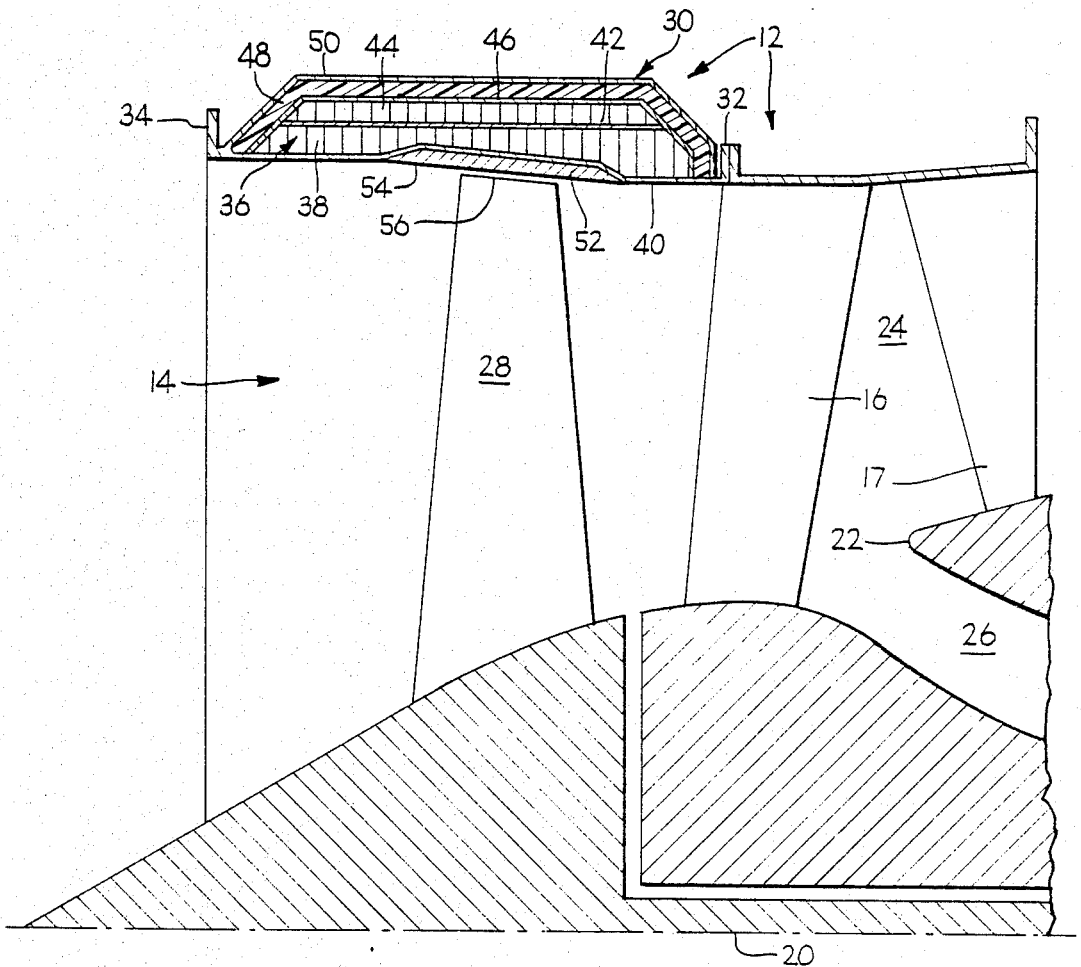
FIG. 2 is an enlarged cross-sectional view of FIG. 1 illustrating in more detail the containment structure of FIG. 1.

Referring now to FIG. 2, there is shown in more detail the portion of the fan casing 12 including containment structure 30 and the elements therein. Containment structure 30 is attached to the engine 10 at an aft flange 32 of an aft portion of the fan casing 12 and is effective for supporting forward portions of the engine 10, such as the inlet cowl 31, at a forward flange 34.

A nesting area 36 includes an annular first radially inner honeycomb region 38 bounded at its radially inner surface by an inner wall 40 and at its outer surface by a septum 42. An annular second, radially outer honeycomb region 44 shares septum 42 as its inner wall and is bounded at its outer surface by an outer wall 46. A containment blanket 48 which may include, for example, a plurality of plies or layers of Kevlar fabric is overlaid on outer wall 46. Containment blanket 48 is secured in position by any suitable means such as, for example, by clamping the edges thereof by conventional means (not shown). Alternatively, containment blanket 48 may be retained in its operative position by an outer protective shell 50 with the outward forces of blade fragments being absorbed and distributed around the circumference of containment structure 30 by containment blanket 48.

A shallow depression 52 in inner wall 40 contains a suitable rub strip 54 against which tips 56 of the blades 28 are closely fitted for providing a sealing area for reducing the amount of air leaking over the tips 56. Rub strip 54 is a material which may be easily and smoothly worn away by tip 56 of blade 28 during initial run in so that as tight a tip seal as possible is obtained. Since this material and the technique for its use is conventional, it will not be further detailed herein.

Inner wall 40 and septum 42 bounding inner honeycomb region 38 may be of any suitable material such as, for example, aluminum. Outer wall 46 may also be of any suitable material such as, for example, aluminum or fiber material in an epoxy resin matrix. However, in the preferred embodiment, for additional strength and rigidity, a graphite fiber material in an epoxy resin matrix is preferred in this location. Finally, protective shell 50 may also be of any convenient material such as aluminum or a fiber/resin matrix, however, in the preferred embodiment, for additional containment and protection, protective shell 50 is a Kevlar fabric in an epoxy matrix.

Septum 42 may be a single sheet or layer of metal or other material or alternatively may be two separate sheets of material installed face to face. The inner and outer honeycomb cores 38 and 44, respectively, may be, for example, aluminum.

In operation, if one or more fragments of blades 28 are freed, they create puncture holes in inner wall 40, septum 42 and outer wall 46 and are contained by containment blanket 48. However, the loss of one or more blades 28 may provide such a severe imbalance that remaining blades 28 move in an increased orbit about the original axis of shaft 20 thereby penetrating rub strip 54 and passing through shallow depression 52 into inner honeycomb region 38. Inner honeycomb region 38 is made deep enough so that the maximum radially outward excursion of tips 56 of blades 28 do not reach septum 42.

More specifically, the septum 42 of the inner honeycomb region 38 is spaced a predetermined distance radially outward from the inner wall 40 and the blade tips 56. The predetermined distance exceeds a maximum radial penetration distance of the tips 56 of the blades 28 in a maximum unbalanced condition of the fan 14 so that the outer honeycomb region 44 remains intact and undamaged and provides structural strength to the blade containment structure 30. Thus, in a worst-case situation, substantially all of septum 42, outer honeycomb region 44 and outer wall 46 remain undamaged to provide load carry-through from forward flange 34 to aft flange 32 even with an annular strip of inner honeycomb region 38 substantially damaged.

The exact depth of the inner honeycomb region 38 required for a particular engine depends, of course, on the engine and the type of damage which it may experience. One skilled in the art, in the light of the present disclosure, would be able to determine this depth for any engine of interest under a given set of conditions.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, although a Kevlar fabric blanket is preferred, the blanket could also be made of other suitable materials including synthetic fibers or metals.

Having thus described the invention, what is claimed as novel and desired to be secured by Letters Patent of the United States is:

1. A blade containment structure surrounding a fan in a fan jet engine comprising:
    a honeycomb structure spaced radially outwardly from and surrounding the entire tips of blades of said fan;
    a fabric blanket surrounding said honeycomb structure;
    said fabric blanket being of a type effective to contain fragments of said blades thrown outward by damage to said fan;
    said honeycomb structure including an inner honeycomb region having an inner wall and a septum, said septum being an outer wall of said inner honeycomb region and being spaced a predetermined distance radially outward from said inner wall; and
    said honeycomb structure further including an outer honeycomb region disposed radially outwardly of said inner honeycomb region and being bounded by said septum and an outer wall.

2. A blade containment structure according to claim 1 wherein said blade containment structure is a portion of a fan casing and said predetermined distance exceeds a maximum radial penetration distance by tips of said blades in a maximum unbalanced condition of said fan whereby said outer honeycomb region remains intact and provides structural strength to said blade containment structure for supporting an inlet cowl attached thereto.

3. A blade containment structure according to claim 1 wherein said septum is a single layer.

4. A blade containment structure according to claim 3 wherein said single layer is aluminum.

5. A blade containment structure according to claim 1 wherein said outer wall is a fiber material in a resin matrix.

6. A blade containment structure according to claim 5 wherein said fiber is a graphite fiber and said resin matrix is an epoxy resin matrix.

7. A blade containment structure according to claim 1 wherein said fabric blanket is a plurality of layers of Kevlar fabric.

8. A blade containment structure according to claim 7 wherein said fabric blanket includes an outer protective shell of Kevlar fabric in an epoxy matrix.

9. A blade containment structure for surrounding blades of a gas turbine engine comprising:
    an annular honeycomb structure positionable radially outwardly of the entire axially extent of blade tips of said blades and including:
        a radially inner honeycomb region bounded by a septum and an inner wall spaced radially inwardly therefrom and being faceable toward said blade tips; and
        a radially outer honeycomb region bounded by said septum and an outer wall spaced radially outwardly therefrom; and
    a fabric containment blanket disposed radially outwardly of said outer wall of said second honeycomb region and being of a type effective for containing blade fragments thrown outwardly upon damage to said blades.

10. A blade containment structure according to claim 9 wherein said septum is spaced a predetermined distance radially outwardly from said inner wall so that said outer honeycomb region is not damaged due to orbiting of said blades upon damage thereof and is thereby effective for retaining blade fragments which puncture said inner wall, septum, and outer wall and are contained by said containment blanket.

11. A blade containment structure according to claim 10 wherein said blade containment structure is effective as a portion of a casing of said engine and said outer honeycomb region including said septum and said outer wall are effective for providing load carry-through to support a second structure of said engine.

12. A blade containment structure according to claim 9 wherein said inner wall, septum, and outer wall of said honeycomb structure join at axially spaced ends thereof to define an aft flange and a forward flange, said blade containment structure being effective as a portion of an engine casing and being fixedly joinable thereto at said aft flange, said honeycomb structure being effective for providing load carry-through to said forward flange for supporting a second structure of said engine attachable thereto.

13. A blade containment structure according to claim 12 wherein said casing is a fan casing, said blades are fan blades and said second structure is an inlet cowl.

14. A blade containment structure according to claim 9 wherein said containment blanket comprises a plurality of layers of Kevlar fabric.

15. In a gas turbine engine including a fan having a plurality of blades, a fan casing, and an inlet cowl, a fan blade containment structure comprising:
    an annular honeycomb structure disposed radially outwardly of the entire axial extent of blade tips of said fan blades and including:
        a radially inner honeycomb region bounded by a septum and an inner wall spaced radially inwardly therefrom and facing toward said blade tips;
        a radially outer honeycomb region bounded by said septum and an outer wall spaced radially outwardly therefrom; and
        said inner wall, septum and outer wall being fixedly joined at axially spaced ends thereof to define an aft flange and a forward flange, said aft flange being fixedly joined to said fan casing and said forward flange being fixedly joined to said inlet cowl, said honeycomb structure being effective for providing load carry-through to said forward flange for supporting said inlet cowl to said fan casing; and
    a fabric containment blanket disposed radially outwardly of said outer wall of said second honeycomb region and being effective for containing blade fragments thrown outwardly upon damage to said blades.

16. A fan blade containment structure according to claim 15 wherein said septum is spaced a predetermined distance radially outwardly from said inner wall so that said outer honeycomb region is not damaged due to orbiting of said blades upon damage thereof and is thereby effective for retaining blade fragments which puncture said inner wall, septum and outer wall and are contained by said containment blanket.

17. A fan blade containment structure according to claim 15 wherein said containment blanket comprises a plurality of layers of Kevlar fabric.

* * * * *